United States Patent [19]
Hoorn

[11] Patent Number: 5,211,385
[45] Date of Patent: May 18, 1993

[54] APPARATUS FOR STORING FILM SHEETS

[75] Inventor: Wellem A. Hoorn, Amersfoort, Netherlands

[73] Assignee: E. I. Du Pont de Nemours and Company, Wilmington, Del.

[21] Appl. No.: 797,486

[22] Filed: Nov. 22, 1991

[51] Int. Cl.⁵ .............................................. B65H 1/02
[52] U.S. Cl. .................................... 271/3.1; 271/9; 271/31.1; 271/149
[58] Field of Search ................... 271/3.1, 149, 31.1, 271/9

[56] References Cited

U.S. PATENT DOCUMENTS

| | | | |
|---|---|---|---|
| 4,086,493 | 4/1978 | Krumrey et al. | 250/468 |
| 4,245,835 | 1/1981 | Turner | 271/226 |
| 4,324,478 | 4/1982 | Fukushima et al. | 354/312 |
| 4,338,522 | 7/1982 | Stievenart | 271/3.1 X |
| 4,365,793 | 12/1982 | Van Blokland et al. | 271/3.1 |
| 4,482,146 | 11/1984 | Hoorn | 271/127 |
| 4,509,736 | 4/1985 | Stahl et al. | 271/11 |
| 4,516,763 | 5/1985 | Stahl et al. | 271/11 |
| 4,709,913 | 12/1987 | Cagey | 271/207 |
| 4,771,174 | 9/1988 | Torii | 271/3.1 X |
| 4,777,365 | 10/1988 | Torii | 271/3.1 X |
| 4,848,764 | 7/1989 | Tajima et al. | 271/90 |
| 4,854,569 | 8/1989 | Mizuta | 271/98 |
| 4,915,368 | 4/1990 | Tsunekawa et al. | 270/58 |
| 4,968,014 | 11/1990 | Yamakoski et al. | 271/3.1 |
| 5,003,335 | 3/1991 | Müller | 354/312 |

FOREIGN PATENT DOCUMENTS 1501116 2/1978 United Kingdom .

Primary Examiner—Richard A. Schacher

[57] ABSTRACT

The present invention relates to an apparatus for receiving, storing and dispensing a plurality of sheets of film in a plurality of sizes, particularly for use in automatic daylight film handling systems.

16 Claims, 13 Drawing Sheets

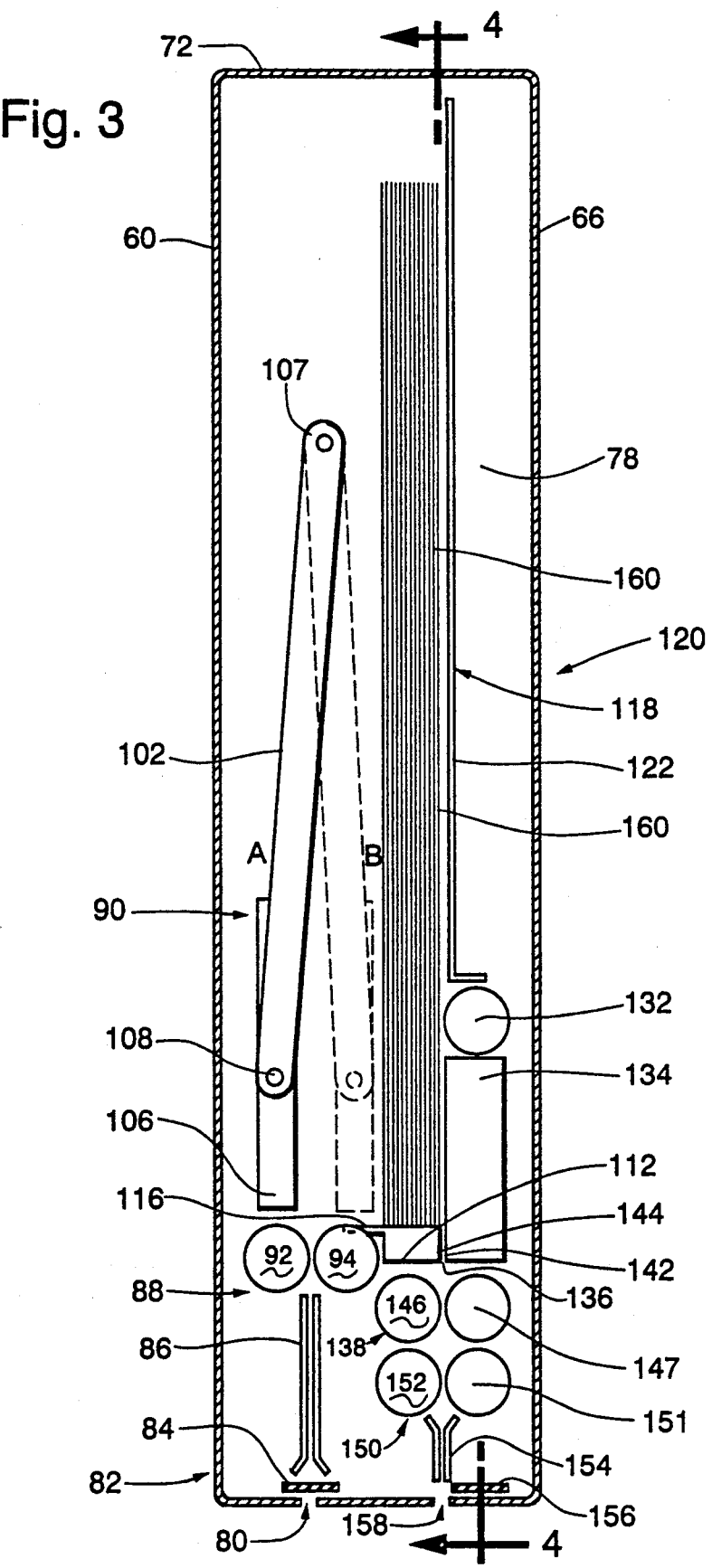

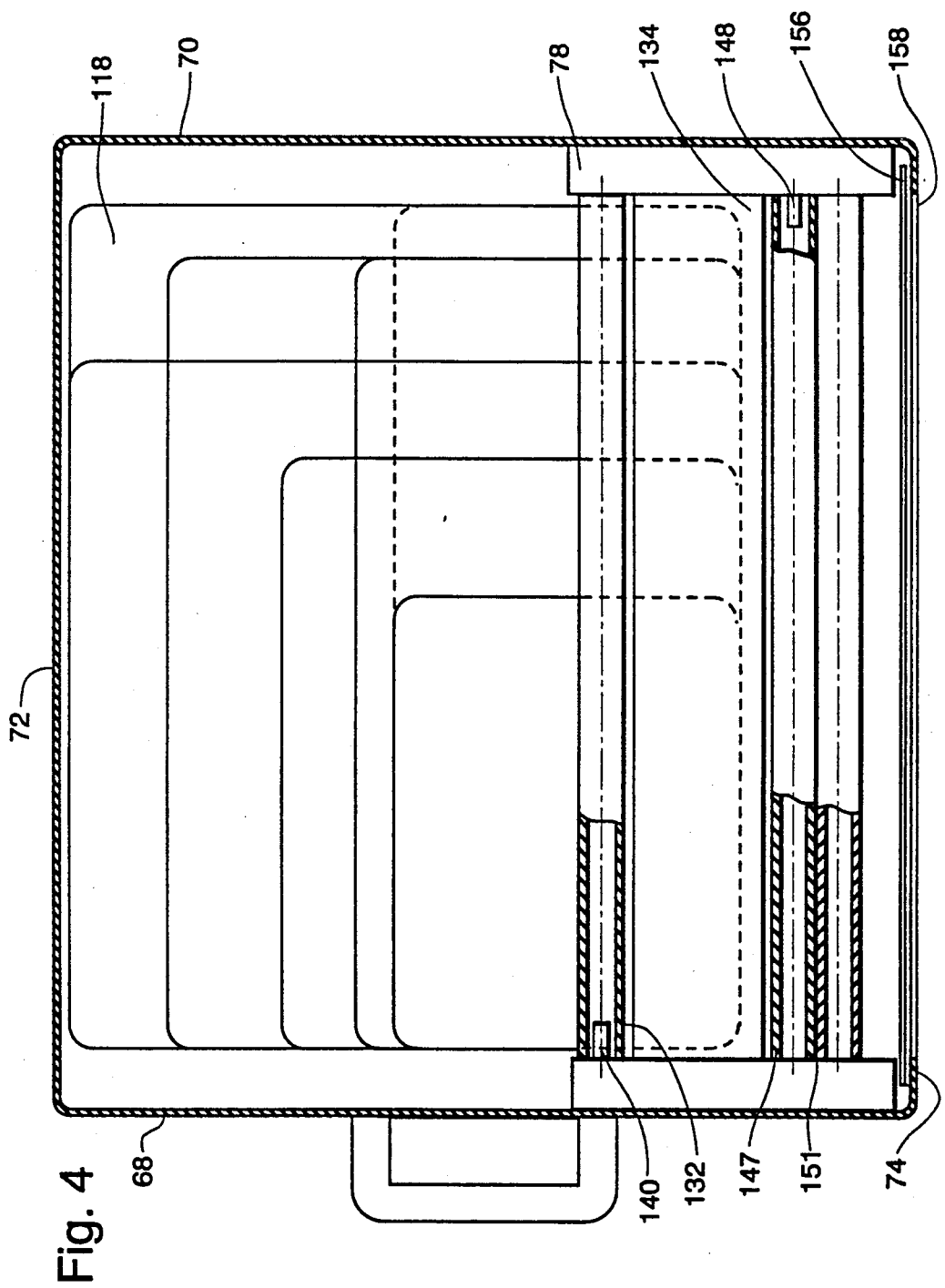

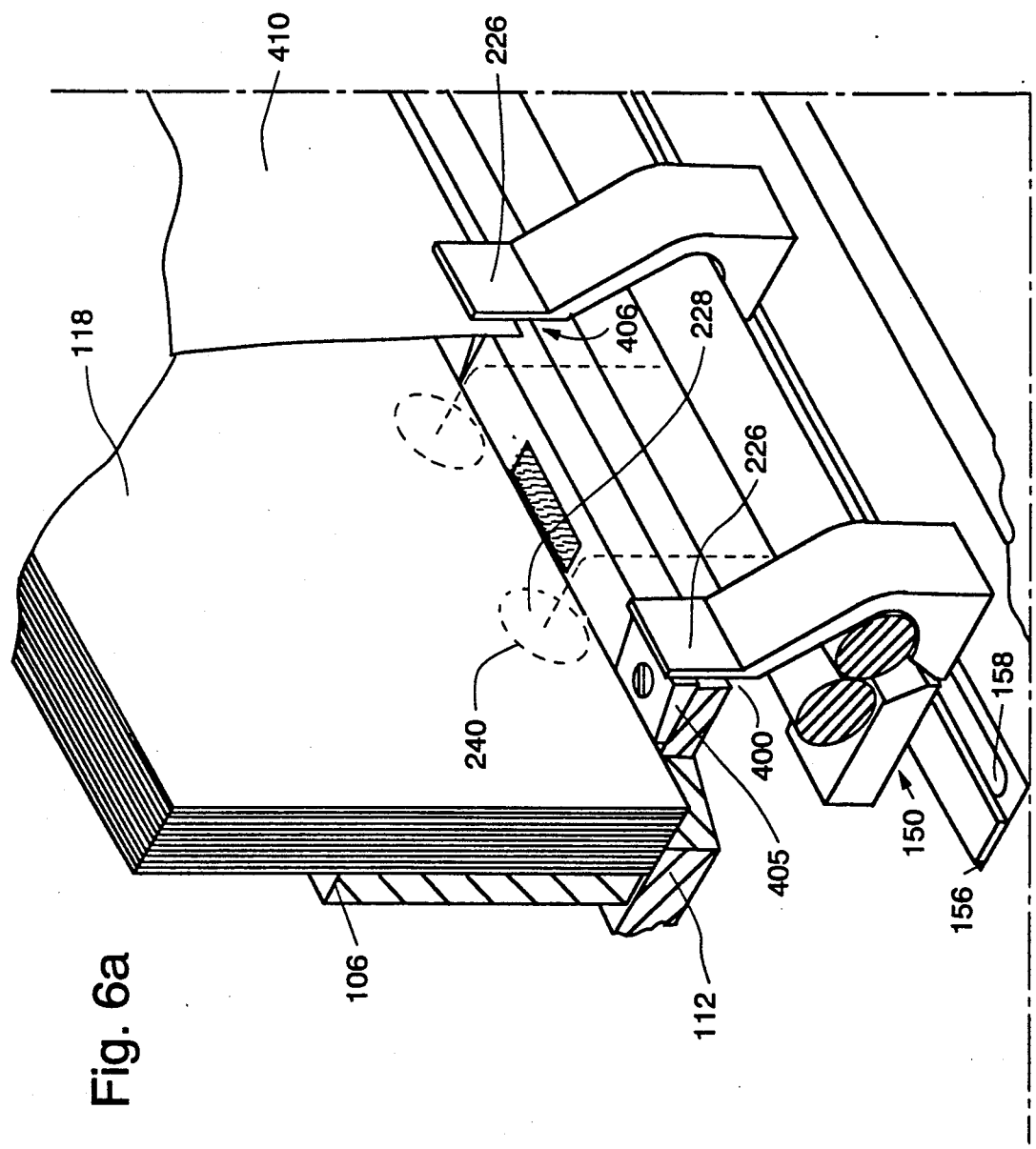

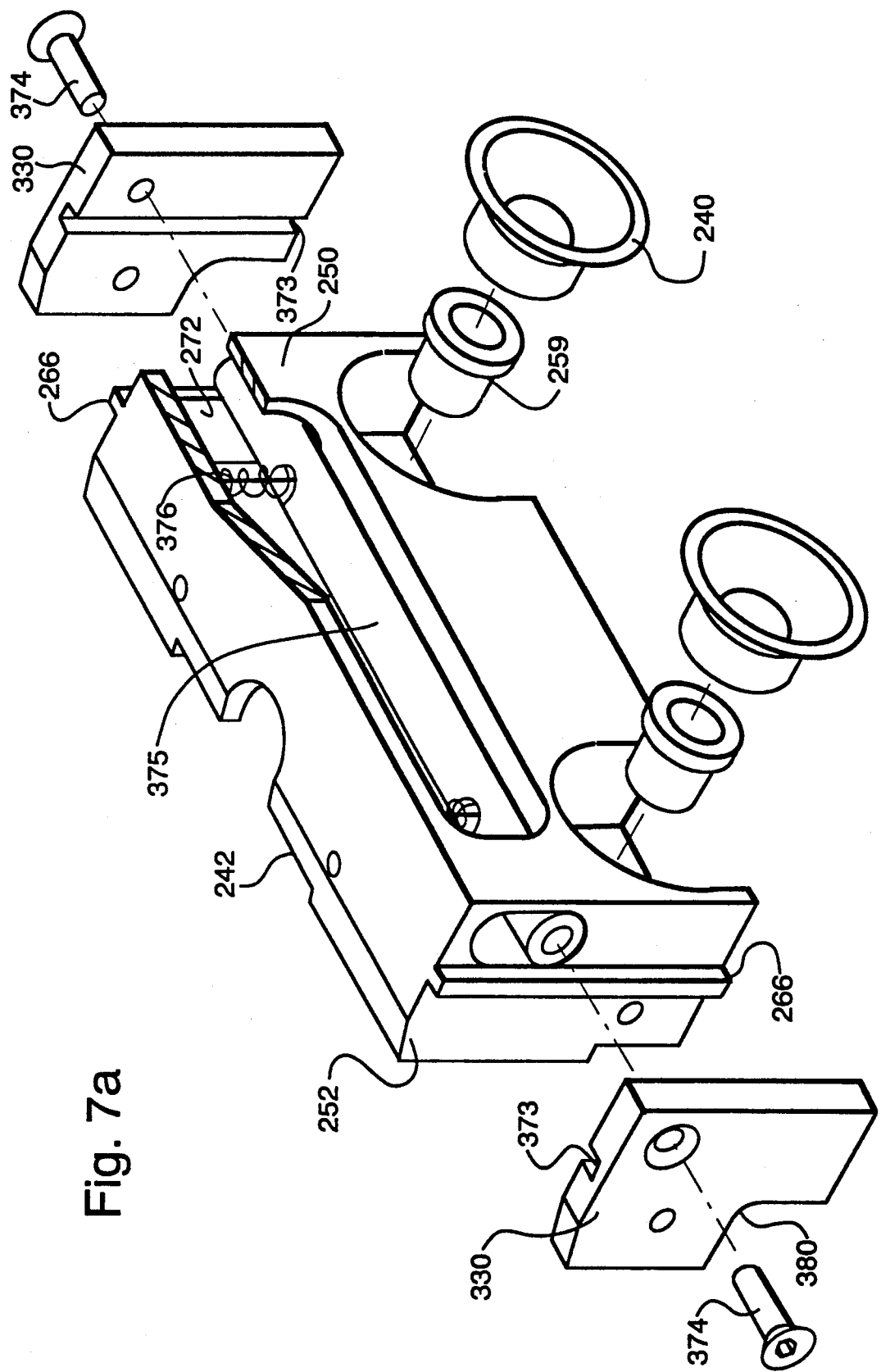

APPARATUS FOR STORING FILM SHEETS

BACKGROUND OF THE INVENTION

1. Field of the Invention

This invention relates to an apparatus for receiving, storing and dispensing a plurality of sheets of film in a plurality of sizes, particularly for use in automatic daylight film handling systems.

2. Description of Related Art

Until the advent of automatic film handling systems, film sheets and, in particular, X-ray film sheets were handled manually by loading the film sheet into a cassette in the dark, exposing it under daylight conditions and then taking the cassette into a darkroom, opening it and placing the film sheet into a processor all in the dark. Various systems are available for the handling of photographic film sheets and, in particular, X-ray film sheets (or radiographs) in daylight conditions.

One such system for automatic daylight handling of film in a cassette is an apparatus which automatically opens the cassette, removes the exposed film sheet, places an unexposed sheet into the cassette, closes the cassette and ejects the reloaded cassette to an operator; during which time the exposed film sheet is transported to a film processor for development. However, efforts to increase the productivity of the film handling apparatus to quickly unload and load cassettes is limited by a time lag between the unloading and transporting of the exposed film to the processor and the time required for the film processing. Typically the time required for film processing is longer than the time to unload and transport the film.

U.S. Pat. No. 4,482,146 issued to Hoorn discloses an apparatus for separating and dispensing a single film sheet from a stack of sheets. The apparatus is manually loaded with a single size stack of film sheets and placed vertically in a daylight film handling system so that the apparatus can automatically dispense a single film sheet from the stack of sheets. Although this apparatus is typically used in daylight film handling systems as described previously, the apparatus is not able to automatically receive and store film sheets in the apparatus. Further, the apparatus does not have the capability of receiving, storing and dispensing a plurality of sizes of film sheets.

U.S. Pat. No. 4,365,793 issued to Van Blockland et al discloses a device for unloading exposed films from a magazine and transporting the exposed film into a film processor. The films are dispensed to the processor in a horizontal or substantially horizontal orientation. The device is not disclosed in conjunction with a film handling apparatus which loads and unloads a film into a cassette. Further, the fact that the device operates in a horizontal or substantially horizontal orientation would add to the overall floor space requirements for a film handling apparatus.

U.S. Pat. No. 4,245,835 issued to Turner discloses an apparatus for receiving a plurality of sheet films from film cassettes and presenting them in series to an associated film processor. The apparatus can store three film sheets in a path created between the location where the film in a cassette is dispensed to the feed of the processor. The device is not disclosed in a film handling apparatus which loads and unloads film into a cassette. A disadvantage of this apparatus is that the path would consume considerable space in a film handling system in order to store a plurality of film sheets necessary to equalize the time lag between the film sheet unloading from the cassette and entering into the processor.

SUMMARY OF THE INVENTION

In accordance with this invention, there is provided an apparatus for receiving a plurality of sheet films in a plurality of sizes each sheet having a least one edge, storing the films and dispensing the films serially, the apparatus comprising:

a light-tight housing including a film entrance slot, a film storage cavity and a film exit slot;

a film storage platform in the housing for storing at least one sheet of film on its edge;

a first pair of nip rollers for transporting a film sheet from the film entrance slot to the film storage platform;

film supporting means for supporting the at least one sheet of film when the film is stored on the platform;

pressure plate means for contacting, supporting and transporting the at least one film sheet along the edge along the platform to a dispensing position in contact with the film supporting means; and single film sheet dispensing means, associated with the platform and the film supporting means, for receiving at least one film sheets and dispensing one sheet at a time.

BRIEF DESCRIPTION OF THE DRAWINGS

The invention can be more fully understood from the following detailed description thereof in connection with accompanying drawings described as follows.

FIG. 4 is a planar view of a second or back side of the first embodiment of the storage apparatus of this invention with a back side housing removed.

FIG. 6a is a cutaway perspective view of a dispensing assembly of the second embodiment of the storage apparatus of this invention.

FIG. 7a is a cutaway exploded perspective view of a vacuum element assembly of the second embodiment of the storage apparatus of this invention.

FIGS. 9a and 9b are flowcharts of the sequence of events to dispense a film from a second embodiment of a dispensing assembly of the intermediate film storage apparatus of this invention.

DESCRIPTION OF THE PREFERRED EMBODIMENTS

Figure 1:
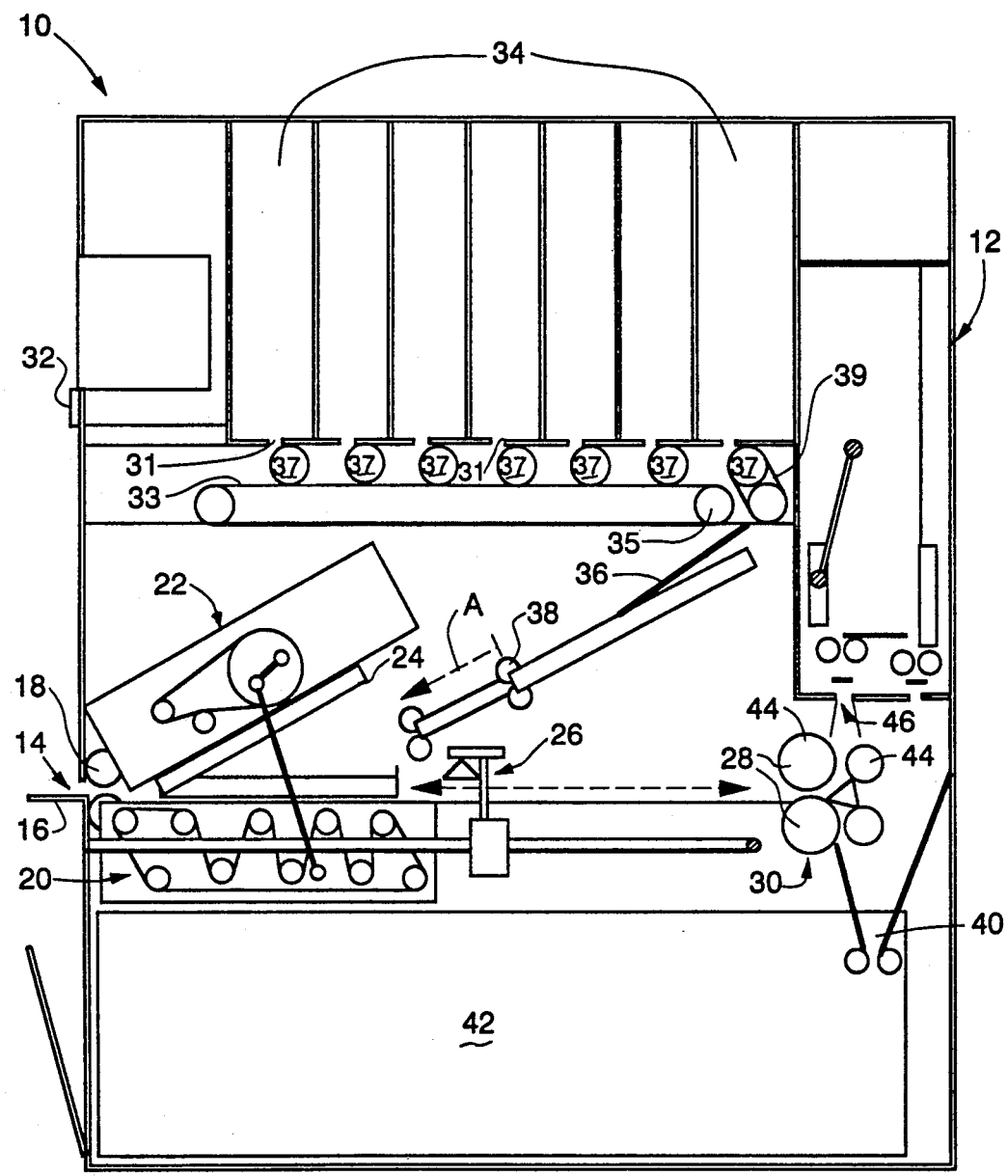
FIG. 1 is a simplified schematic view of a cross-section of an automatic film handling apparatus including a schematic representation of an intermediate film storage apparatus of this invention.

Throughout the following detailed description, similar reference characters refer to similar elements in all figures of the drawings.

Referring to FIG. 1, an automatic daylight film handling apparatus 10 is shown with an intermediate film storage apparatus 12 of this invention. The operation of the automatic film handling apparatus 10 begins by an operator inserting a closed cassette having an exposed film into a slot 14 adjacent a feed tray 16 in the film handling apparatus 10. The slot has a light gate (not shown) which opens and closes to allow the cassette into the apparatus and yet prevent light into an interior of the apparatus. A pair of nip rollers 18 inside the entrance slot 14 initially transport the cassette from the feed tray 16. A plurality of rollers 20 transport the cassette further into a cassette opening-closing assembly 22. During transport of the cassette into the opening-closing assembly 22, the cassette is aligned to a front corner of the opening-closing assembly 22. The opening-closing assembly 22 opens the cassette by disengaging latches on the cassette and lifting a door of the cassette. Exposed film in the opened cassette 24 is removed from the cassette 24 by a vacuum-operated lifting assembly 26 which lifts and transports the exposed film to a first pair of nip rollers 28 of a film diverter assembly 30. For example, the vacuum-operated lifting assembly 26 can be as disclosed in U.S. patent application Ser. No. 07/552,552. The operator may input at a console 32 associated with the film handling apparatus 10 the type of film desired for the re-loading of the cassette 24. Alternately, a microcomputer associated with the apparatus 10 can determine the type of film needed from a sensor reading a label on the cassette 24.

An appropriate fresh, i.e., non-exposed, film is dispensed from one of a plurality of film storage magazines 34 through a dispensing slot 31 onto a first endless belt 33 which is driven by a roller 35. For a detailed description of a suitable film storage magazine 34 that can be used as stated herein, see U.S. Pat. No. 4,482,146. The first belt 33 is moving clockwise in FIG. 1 when a fresh film is dispensing so that the leading edge of the film is directed to a nip formed between a top surface or run of the first belt 33 and a roller 37 substantially below the film storage magazine 34 and beside the dispensing slot 31. Since each roller 37 associated with a film storage magazine 34 forms a nip between itself and the top run of the first belt 33, the fresh film is transported on the first belt 33 to a nip formed between the first belt 33 and a second endless belt 39. The second belt 39 is driven by frictional contact with the first belt 33 and moves counter-clockwise in FIG. 1. When the leading edge of the film contacts the second belt 39, the film is directed into the nip between the first belt 33 and the second belt 39 which transports the film to a chute 36.

The fresh film travels down the chute 36 to a pair of nip rollers 38 which hold the fresh film and extend in the direction of arrow (A) in FIG. 1 to place the fresh film into the opened cassette 24. The opening-closing assembly 22 closes the cassette 24 and secures the latches on the cassette 24. The plurality of rollers 20 transport the cassette 24 from the opening-closing assembly 22 and eject the cassette 24 onto the feed tray 16.

Meanwhile, a sensor (not shown) detects the presence of the exposed film at a nip between the first pair of rollers 28 of the film diverter assembly 30 and sends the film presence information to the microcomputer. The microcomputer also receives information on the presence of a film in a feed tray 40 of a processor 42 associated with the film handling apparatus 10. The microcomputer determines whether the film can be transported directly into the processor 42 or should be transported into the intermediate film storage apparatus 12 of this invention for dispensing at a later time, and directs the movement of the film diverter assembly 30 to thereby guide the exposed film to the appropriate path accordingly. FIG. 1 shows the diverter assembly 30 in position to divert the film into the intermediate film storage apparatus 12. In the case where the film is directed into the intermediate film storage apparatus 12, the film is transported vertically or substantially vertically by a second pair of nip rollers 44 of the diverter assembly 30 into an entrance 46 to the intermediate storage apparatus 12. For a detailed description of a suitable diverter assembly 30 that can be used, see U.S. patent application No. 07/796,520.

Figure 2:
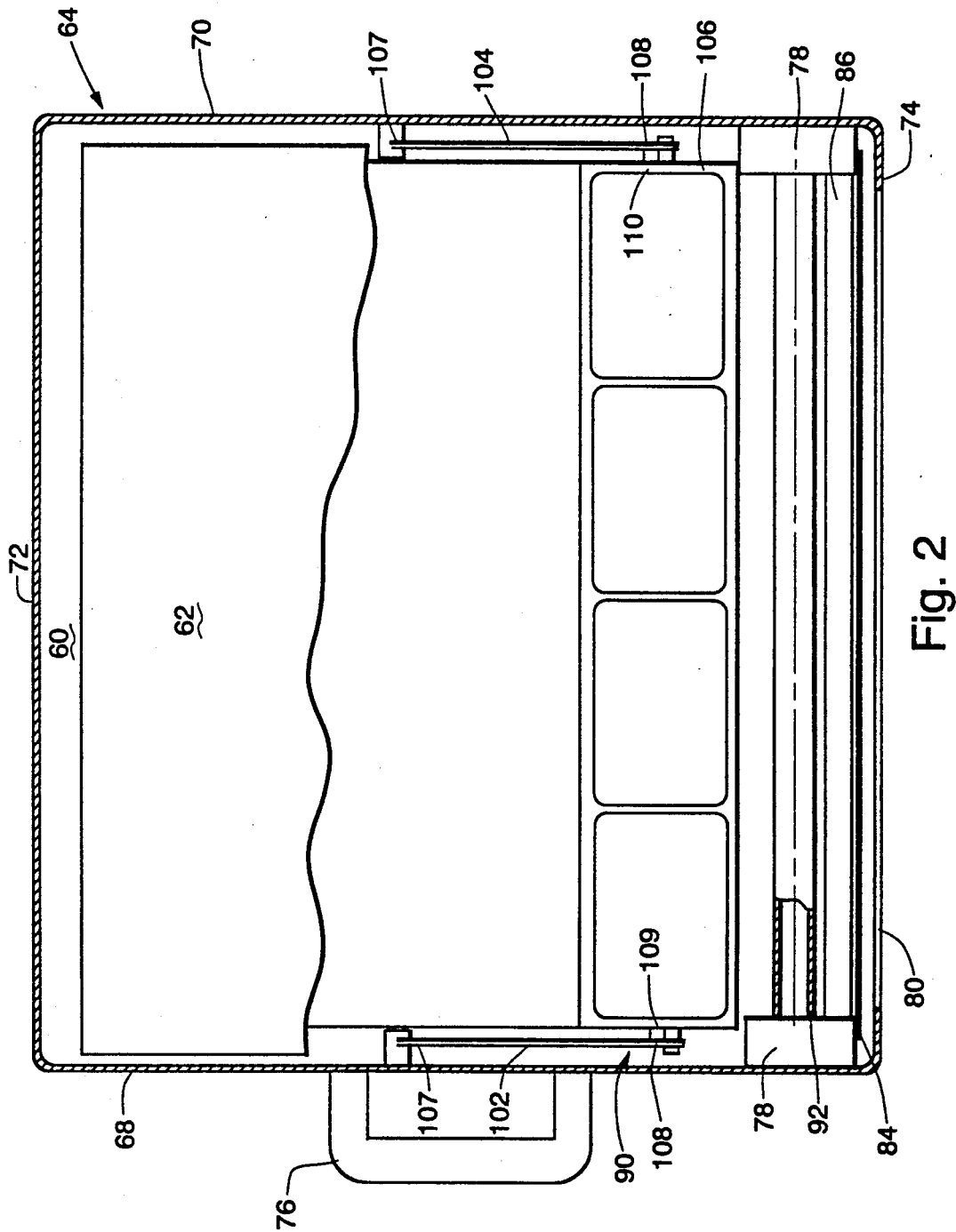
FIG. 2 is a planar view of a first or door side of the storage apparatus of this invention with a door side housing partially cutaway.

Referring to FIG. 2, a planar view of a first or door side 60 of the intermediate storage apparatus 12 of this invention is shown with a door 62 and a housing 64 partially cutaway. Hereinafter, the intermediate storage apparatus 12 may also be referred to as a storage apparatus 12. The storage apparatus 12 comprises the housing 64 having the first or door side 60, a second or back side 66 (see FIG. 3), a third or handle side 68, a fourth side 70, a top side 72, and a bottom side 74. The door 62 is mounted with a recessed hinge (not shown) to the bottom side 74 of the housing 64. The door 62 has at least one latch (not shown) to secure the door 62 to the housing 64. When closed, which is the typical situation during operation, the door 62 is flush with the first side 60 of the housing. The door 62 allows for access to an interior of the storage apparatus 12 for manual unloading of stored film, as may be the case when the processor 42 associated with the film handling apparatus 10 is down for an extended period of time. The third side 68 of the housing 64 has a handle 76 for removing the storage apparatus 12 from the film handling apparatus 10 and carrying the storage apparatus 12. The interior of the third 68 and fourth 70 sides of the housing 64 have enclosed spaces 78 for mounting motors, gearing, one or more microprocessor, circuitry, etc., needed for operation of the apparatus 12. The bottom side 74 has an entrance slot 80 by which film enters the storage apparatus 12.

FIG. 2 further shows a film entrance assembly 82 which comprises the film entrance slot 80, a first light gate 84, a film entry guide 86, a pair of entrance nip rollers 88 (e.g., see FIG. 3), and a pressure plate assembly 90. The first light gate 84 is a conventional mechanical light gate which opens to permit a film to enter the storage apparatus 12. Typically the first light gate 84 is closed at all other times to prevent light from entering the interior of the storage apparatus 12 and possibly exposing stored film. The film entry guide 86 is mounted to the interior of the third 68 and fourth 70 sides of the housing 64 and is located between the first light gate 84 and the pair of entrance rollers 88. The film entry guide 86 guides an entering film from the entrance slot 80 into a nip between the entrance rollers 88. The pair of entrance rollers 88 transport an entering film further into the interior of the housing 64. The pair of entrance rollers 88 comprise an idler roller 92 and a drive roller 94 which are mounted between walls of the enclosed spaces 78. A motor and gearing for driving the drive roller 94 are mounted in the enclosed spaces 78. The idler roller 92 rotates due to frictional contact with the drive roller 94 and/or the film being transported by the drive roller 94. A film sensor (not shown) is located just prior to the nip of the entrance rollers 88 to detect the leading and lagging ends of an entering film sheet.

Figure 3A:
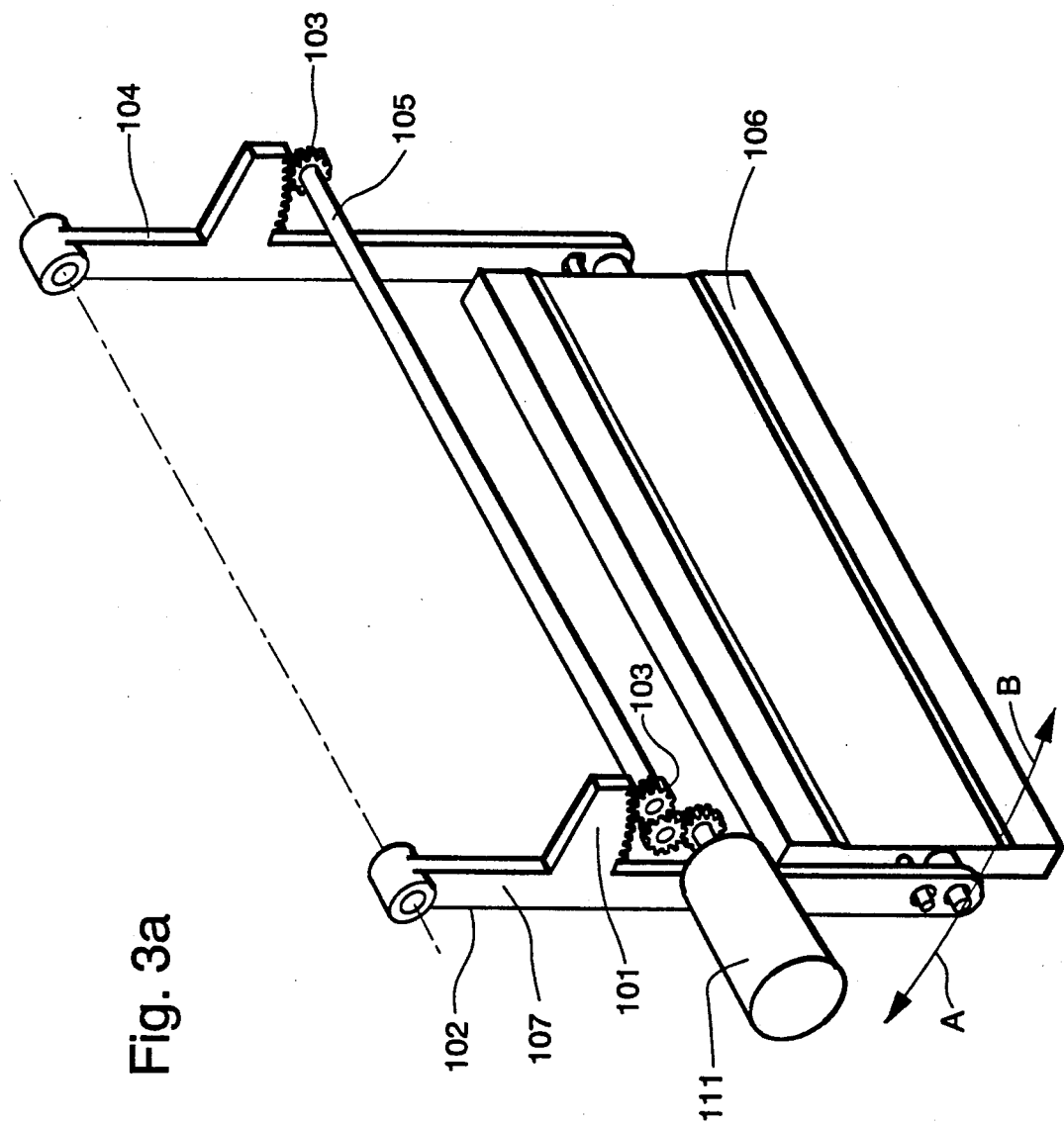
FIG. 3a is a perspective view of a pressure plate assembly useful for the storage apparatus of this invention.

The pressure plate assembly 90 includes a first swing arm 102, a second swing arm 104 (see FIG. 2), a shaft 105, and a plate 106. The swing arms 102, 104 have a first end 107 and a second end 108. The first end 107 of the first swing arm 102 is pivotally mounted and the first end 107 of the second swing arm 104 is pivotally mounted to the interior of the fourth side 70 of the housing 64. Referring to FIG. 3a, near the first end 107 of the swing arms 102, 104 is an arm 101 which extends from the swing arms 102, 104. The shaft 105 is mounted between the interior of the third side 68 and the interior of the fourth side 70 of the housing 64. At each end of the shaft 105 is mounted a gear 103. The extended arms 101 have toothed portions which engage the gears 103. A motor assembly 111 engages one of the gears 103 on shaft 105 to drive the shaft.

Referring to FIG. 2, the plate 106 has a first end 109 and a second end 110. Each end 109, 110 of the plate 106 is pivotally mounted to one of the second ends 108 of the swing arms 102, 104. Typically, the plate rests in position A illustrated in FIG. 3. The swing arms 102, 104 move the plate 106 to position B (shown in phantom lines in FIG. 3) when a film is being transported from the entrance rollers 88 to a storage position or when a film is being dispensed from the storage position. Pressure is applied by the plate 106 when the swing arms 102, 104 move the plate 106 from position A to position B by the movement of the extended arms 101 along the gears 103 on the shaft 105 driven by the motor assembly 111. Pivotal mounting of the plate 106 to the swing arms 102, 104 allows the plate 106 to maintain a vertical or substantially vertical orientation as the plate 106 moves from position A to position B. This provides a substantially even distribution of the pressure to the portion of the film in contact with the plate 106.

Figure 8:
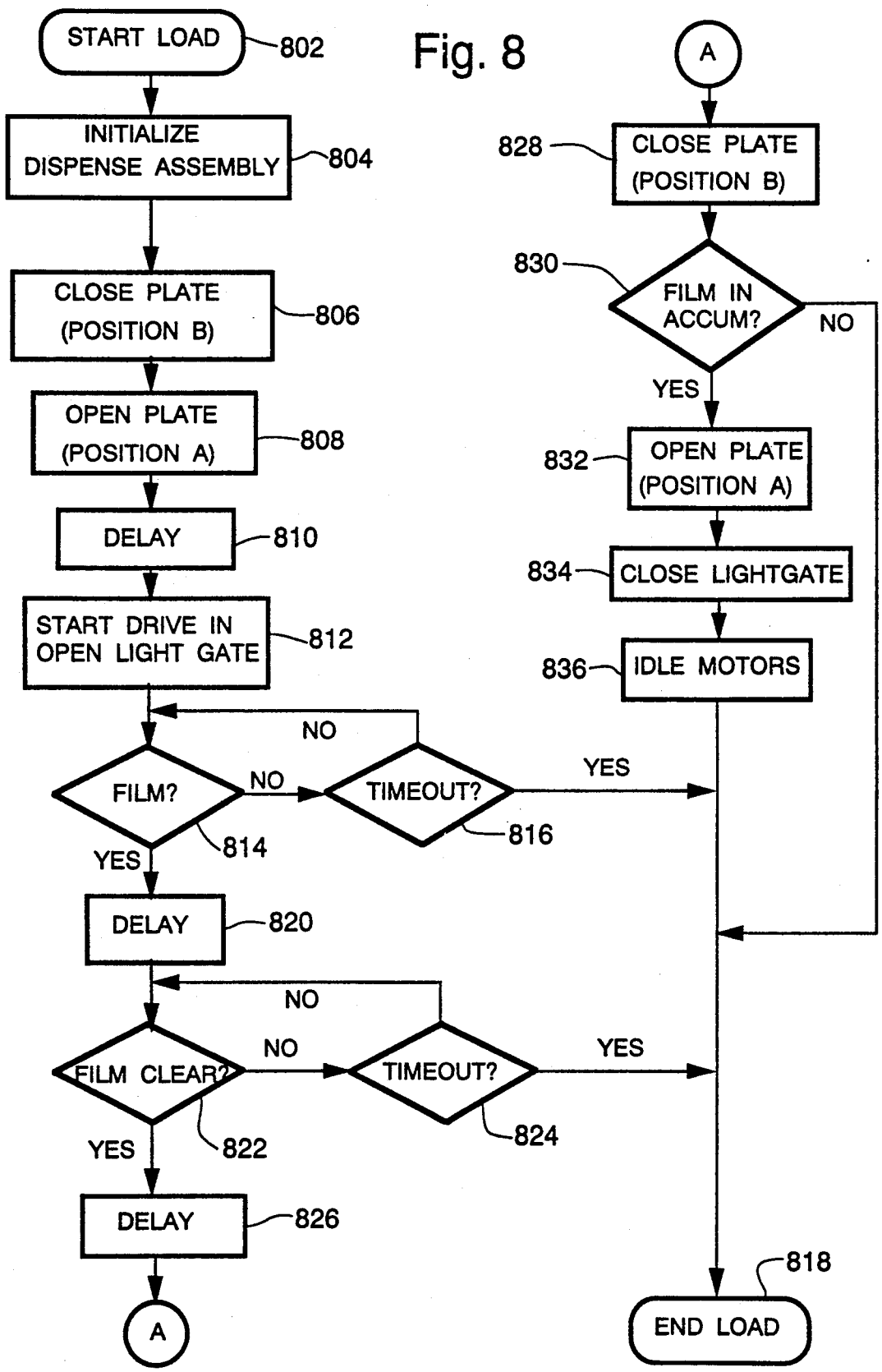
FIG. 8 is a flowchart of the sequence of events to load and store a film into the intermediate film storage apparatus of this invention.

Referring to FIG. 8, the storage apparatus 12 operates as follows for a film entering and storing in the apparatus 12. When a film is being sent to the storage apparatus 12 by the diverter assembly 30 of the film handling apparatus 10, a signal is sent to the storage apparatus by the film handling apparatus 10 to start the loading sequence. This is represented by block 802. Note that in general, delays are incorporated with the loading sequence to allow time for a mechanism to complete its action. The intermediate film storage apparatus 12 conducts checks to verify that various elements of the apparatus are in their initialized position as illustrated at 804. For example, for a second embodiment of a dispensing assembly, the storage apparatus 12 checks that the dispensing assembly is at its initialized position, the purpose for which will be explained later in this specification. As illustrated by blocks 806 and 808, storage apparatus 12 also verifies the operation and position of the pressure plate 106 by moving the plate to position B and back to position A. There is a delay indicated at 810 in which the pressure plate 106 is allowed time to complete its motion. Referring to block 812, the first light gate 84 in the storage apparatus 12 is opened when the second pair of nip rollers 44 of the diverter assembly 30 begin to drive a film into the storage apparatus 12. The film is transported by the second pair of nip rollers 44 of the diverter assembly 30 into the entrance slot 80, through the film entry guide 86, and into the nip of the pair of entrance rollers 88 of the storage apparatus 12. Once the entering film has started the move into the storage apparatus 12, the entry sensor continually checks for the leading edge of the entering film as indicated at 814. If the leading edge of the film is not detected after a period of time as shown by block 816, the loading sequence is ended illustrated by block 818. When the leading edge of the entering film is detected by the entry sensor and at the nip of the entrance rollers 88, the second pair of nip rollers 44 of the diverter assembly 30 stop driving and the entering film is transported vertically or substantially vertically into the storage apparatus 12 by the pair of entrance rollers. There is a delay indicated by block 820 after detecting the leading edge of the entering film to allow time for a film to at least partially transport through the entrance rollers 88, before the entry sensor begins continually checking as illustrated at 822 for the trailing edge of the entering film. If the trailing edge of the entering film is not detected after a period of time (see 824) the loading sequence is ended. The film continues to be driven by the entrance rollers 88 into the interior of the storage apparatus 12 until the trailing edge of the entering film is detected. There is a delay (see 826) to allow time for the trailing edge of the film to clear the nip of the entrance rollers 88. Then as indicated at 828, the pressure plate assembly 90 moves to position B, the plate 106 contacts the trailing portion of the entering film and transports the trailing edge of the film onto a film storage platform 112 (see FIG. 3). An additional film sensor (not shown), then checks as illustrated at 830 to determine if there is at least one film stored in the storage apparatus 12. If no film is detected, the loading sequence is ended. If a film is detected, the plate 106 returns to position A as indicated at 832, the first light gate 84 is closed as indicated at 834, and the motors are idled as indicated at 836 before the loading sequence is ended.

Figure 5:
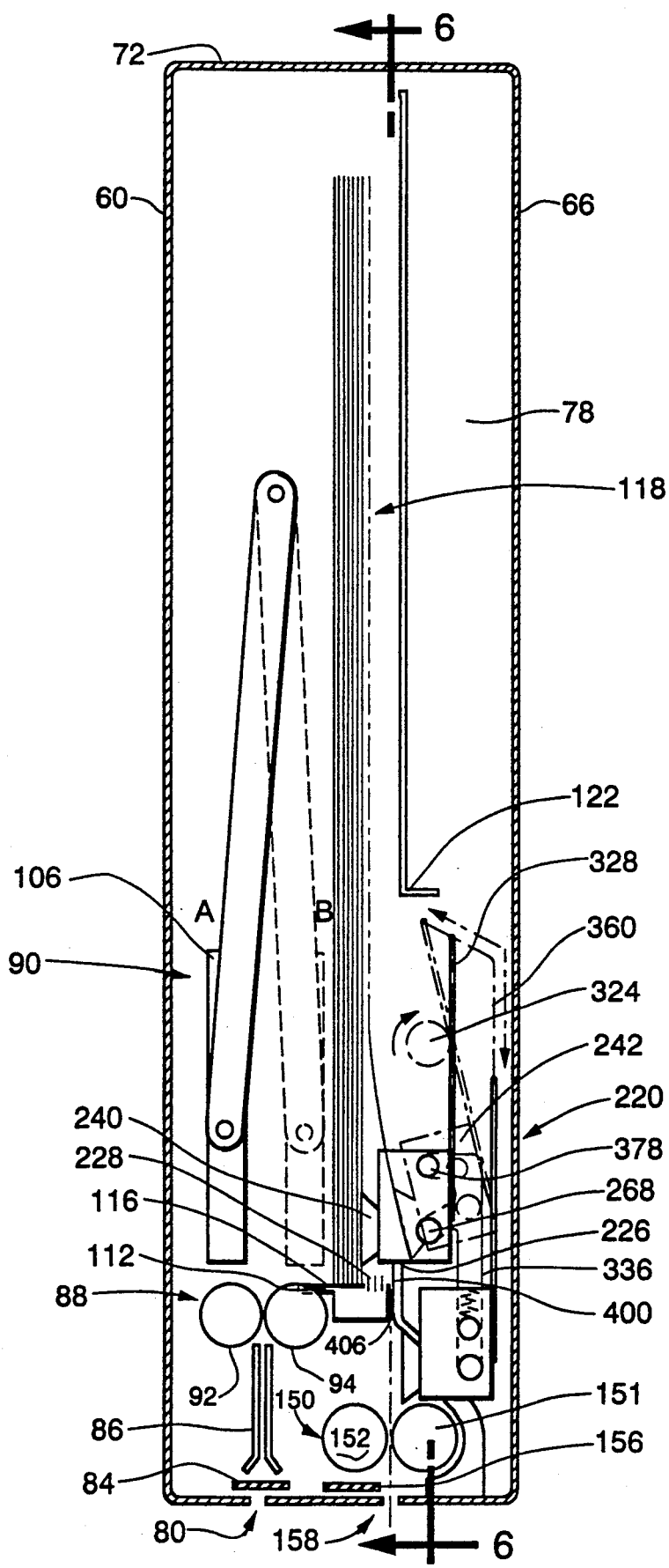
FIG. 5 is a cross-sectional view of a second embodiment of the storage apparatus of this invention.
Figure 3:
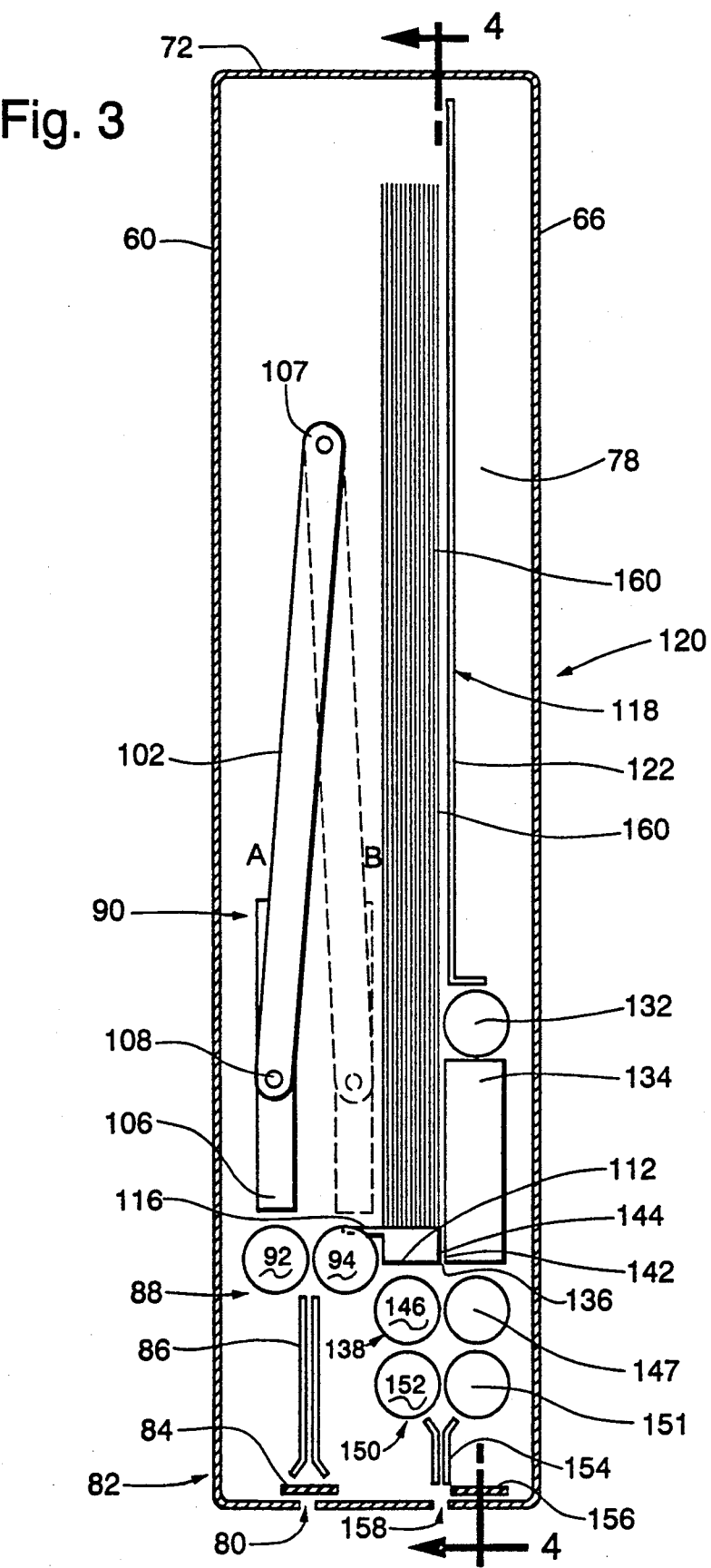
FIG. 3 is a cross-sectional view of a first embodiment of the storage apparatus of this invention.

The film has now entered the storage apparatus 12 and is placed into a storage position on the film storage platform 112 which is shown in detail in FIGS. 3 and 5. The film storage platform 112 has a top or film holding surface 116 which is aligned parallel to and level or substantially level with a tangent of an uppermost surface of the entrance rollers 88. The entered film is transported onto the top surface 116 of the film storage platform 112 by the plate 106 moving to position B, until the film abuts either another film or a stack of films 118 located on the film storage platform or abuts or contacts a first embodiment of a film dispensing assembly 120, shown in FIG. 3 or a second embodiment of a film dispensing assembly 220, shown in FIG. 5. The film is stored vertically or substantially vertically on an edge of the film on the film storage platform 112. The film and/or a stack of films 118 may acquire a slightly curved posture, leaning against film supports mounted interior to the housing, and supported along its bottom edge by the film storage platform 112. A back support plate 122 is mounted between the third 68 and fourth 70 interior sides of the housing 64 to support the film or stack of films 118. Thus the film and/or film stack 118 is held in place by forces which are not applied along its full surface, but at a few points, minimizing any tendency to compact the sheets and aggravate any separation problems. The back support plate 122 and the interior of the second side 66 of the housing 64 form an additional enclosed space 78 for mounting motors, gearing, a microprocessor, circuitry, etc., needed for the operation of the apparatus 12.

A first embodiment of the storage apparatus 12 is distinguished by a film dispensing assembly 120 which is shown in detail in FIGS. 3 and 4. The first embodiment includes the film dispensing assembly 120 which comprises a separating roller 132, a back support block 134, a separation slot 136 and a pair of dispensing rollers 138. The separating roller 132, the back support block 134, and the pair of dispensing rollers 138 are mounted on walls defining the enclosed space 78 on the interior of the third 68 and fourth 70 sides of the housing 64. The separating roller 132 is located between the back support plate 122 and the back support block 134, and spaced opposite or substantially opposite the pressure plate 106 of the pressure plate assembly 90. The separating roller 132 is a driven roller with an idle clutch 140 as shown in FIG. 4. The back support block 134 has a side 142 which is closest to the film storage platform 112 and may come in contact with a film stored on the platform 112, typically the film closest to the back support block 134. The film storage platform 112 has a side 144 closest to the back support block 134 which with a portion of the side 142 of back support block 134 form the separation slot 136. The separation slot 136 is dimensioned to permit a single sheet of film to dispense or pass through the slot 136 at a time. The pair of dispensing rollers 138 is below the separation slot 136, with a nip between the dispensing rollers 138 aligned or substantially aligned vertically below the slot 136. The nip of the pair of dispensing rollers 138 is substantially closed to prevent film from prematurely dispensing from the apparatus 12 and to prevent the possibility of a second stored film from dispensing at the same time as a dispensing or exiting film. The pair of dispensing rollers 138 comprises an idler roller 146 and a drive roller 147. The idler dispensing roller 146 rotates due to frictional contact with the drive roller 147 and/or the film being transported by the drive roller 147. The drive dispensing roller 147 has an idle clutch 148 as seen in FIG. 4. Both the separating roller 132 and the drive dispensing roller 147 are driven by a common motor (not shown). The distance between the separating roller 132 and the dispensing rollers 138 is dimensioned such that the shortest film that is possibly being stored in the storage apparatus 12, is always under the control of the separating roller 132 (with the pressure plate 106) or the dispensing rollers 138, during dispensing.

Below the pair of dispensing rollers 138 is a pair of exit nip rollers 150 for transporting the film out of the storage apparatus 12. The pair of exit nip rollers 150 are mounted on the walls of the enclosed space 78 on the interior of the third 68 and fourth 70 sides of the housing 64. A nip between the exit rollers 150 is aligned or substantially aligned below the nip of the dispensing rollers 138. The exit nip rollers 150 comprise an idler roller 151 and a drive roller 152, and operate accordingly. A film exit guide 154 is located between the pair of exit rollers 150 and a second light gate 156. A film exit slot 158 is located in the bottom side 74 of the housing 64, aligned with the film exit guide 154. The second light gate 156, which is the same as or similar to the first light gate 84, moves to allow the exiting film to pass through the exit slot 158. Film sensors (not shown) are placed near the nip of the dispensing rollers 138 and the exit rollers 150 to detect the leading and lagging ends of a dispensing film 160. The dispensing film 160 is driven at any point in time during dispensing and exiting by only one of the three nip points between (1) the separating roller 132 and the pressure plate 106, (2) the dispensing rollers 138, or (3) the exit rollers 150. The idle clutch 140, 148 on each of the separating roller 132 and the drive dispensing roller 147, permit the roller 132 or rollers 132, 147 to freewheel when a dispensing film 160 is being driven by the dispensing rollers 138 or the exit rollers 150, respectively.

Figure 6:
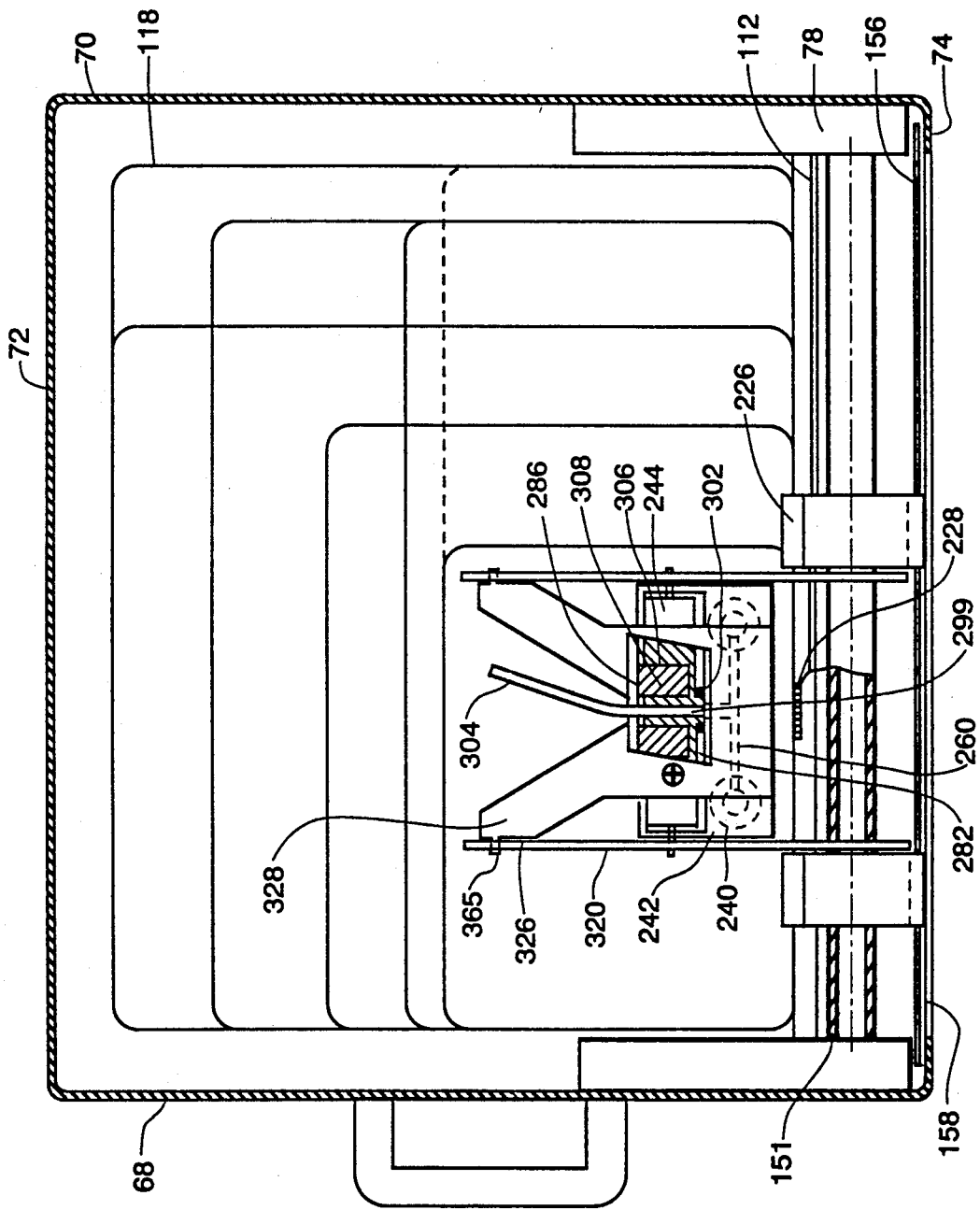
FIG. 6 is a planar view of a second or back side of a second embodiment of the storage apparatus of this invention with a back side housing removed.

The storage apparatus 12 dispenses on a first in-first out basis. Such that if there were a stack of films 118 stored in the apparatus 12, the first film stored is the first film dispensed from the apparatus 12. The film closest to the contacting side of the dispensing assembly 120 or 220 may be the only one or one of a stack of films 118 shown in FIGS. 4 and 6. Note that FIGS. 4 and 6 depict a stack of sheets or films 118 of various sizes suitable for storage in the intermediate storage apparatus 12 of this invention. In one particular embodiment, the intermediate film storage apparatus 12 can store up to and including 50 sheet films of various sizes in a stack 118. Thus, the first film stored is closest to the dispensing assembly 120 or 220. In the first embodiment of the dispensing assembly 120, the first film stored may contact or abut in part the separating roller 132, the back support block 134, and possibly some portion of the back support plate 122.

Referring to FIG. 3, the first embodiment of dispensing assembly 120 operates as follows to dispense a film stored in the storage apparatus 12. The storage apparatus 12 is signaled by the film handling apparatus 10 when the processor 42 is ready to dispense a stored film, i.e. the dispensing film 160 closest the dispensing assembly 120. The second light gate 156 is opened. The pressure plate 106 moves to position B, contacting the film 160 or film stack 118 and applying pressure on the film 160 or film stack 118 to assure intimate contact of the dispensing film 160 with the separating roller 132. Generally, the dispensing film 160 is held in place above the separation slot 136 by the pressure of the pressure plate 106 against the separating roller 132. The motor for the separating roller 132 and the driven dispensing roller 147 is activated. The separating roller 132 drives the dispensing film 160 into and through the separation slot 136 until the leading edge of the dispensing film 160 is at the nip of the dispensing rollers 138 as detected by the dispensing sensor. The separating roller 132 stops driving the dispensing film 160 and freewheels when the dispensing rollers 138 begin to drive the film into the nip of the exit rollers 150. When the leading edge of the dispensing film 160 is at the nip of the exit rollers 150 as detected by the exit sensor, the driven dispensing roller 147 stops driving and freewheels as the exit rollers 150 drive the film out of the storage apparatus 12. The exit rollers 150 drive the dispensing film 160 through the exit film guide 154, and through the exit slot 158. The drive motor are idled. The second light gate 156 is closed and the dispensing sequence is ended.

A second and preferred embodiment of the dispensing assembly 220 for the storage apparatus 12 is shown in detail in FIGS. 5, 6, 6a, 7 and 7a. The second embodiment includes the dispensing assembly 220 which comprises a vacuum element assembly 222 (FIGS. 7 and 7a), a transport assembly 224 (FIG. 7), back support members 226 (FIGS. 5 and 6a), and a roughened surface 228 (FIGS. 5 and 6a). The vacuum element assembly 222 and transport assembly 224 are located between the interior of the third 68 and fourth 70 sides of the housing 64 so that the vacuum element assembly 222 can secure and dispense all possible sizes of films or sheets stored in the storage apparatus 12.

Figure 7:
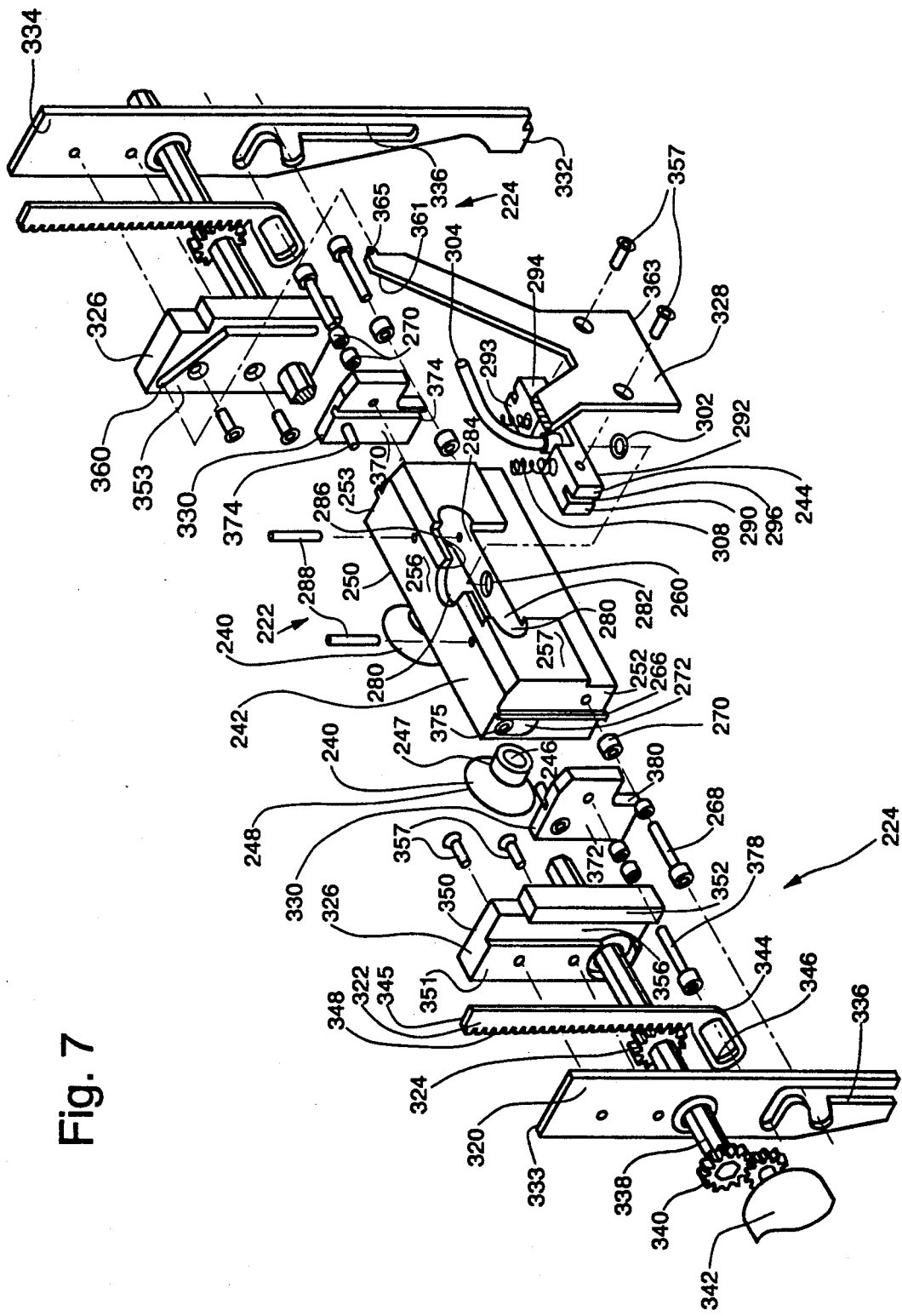
FIG. 7 is an exploded view of a second embodiment of the dispensing assembly.

Referring to FIGS. 6, 7 and 7a, the vacuum element assembly 222 comprises at least 1 and preferably 2 suction cups 240, a support block 242, and a vacuum manifold 244. The vacuum element assembly 222 will be described as the preferred embodiment having 2 suction cups 240. The suction cups 240 are conventional cups having a bore 246, typically in a neck portion 247 of the suction cup 240, through which a vacuum can be pulled when the cup portion 248 contacts a flat or substantially flat surface, i.e., a film sheet. The support block 242 has a first side 250, a second side 252, a third side 253, a fourth side 256 and a fifth side 257. The first side 250 of the support block 242 has spaced openings for mounting the neck portion 247 of the suction cups 240 to the block 242. The bore 246 in the suction cups 240 connect with a coupling 259 to an interior duct 260 in the support block 242 which interconnects the two suction cups 240 to the vacuum manifold 244. The second 252 and third 253 sides of the support block 242 each have a rib 266 and a first protruding pin 268 for interconnection to the transport assembly 224. Two bushings 270 are mounted around a shaft of each of the first protruding pins 268. A slotted passageway 272 extends between the second 252 and third 253 sides of the support block 242. The fourth 256 and fifth 257 sides of the support block 242 have openings 280 which extend into the support block to form a cavity 282. The cavity 282 has a bottom wall 284 and a top wall 286. Two retaining pins 288 are mounted between the fifth side 257 of the support block 242 and the bottom wall 284 of the cavity 282, passing through the cavity 282. The interior duct 260 in the support block 242 opens into the bottom wall 284 of the cavity 282. The vacuum manifold 244 has first distal sides 290, a second side 292, a third side 293 and a fourth side 294. The first sides 290 of the vacuum manifold 4 have keyways 296 which slideably engage the retaining pins 288 passing through the cavity 282. The vacuum manifold 244 is retained in the cavity 282 and can move vertically in the cavity by the keyways 296 engaging the retaining pins 288. The cavity 282 in the support block 242 is larger than the vacuum manifold 244 so that there is space between the vacuum manifold 244 and the bottom 284 and top 286 walls of the cavity 282 when the manifold 244 is recessed in the cavity 282. Referring to FIG. 6, a duct 299 is formed between the second 292 and third 293 sides of the vacuum manifold 244. An opening of the manifold duct 299 in the second 292 side of the vacuum manifold 244 connects the duct 299 with an O-ring 302 seal to an opening for the interior duct 260 in the bottom wall 284 of the cavity 282. A conduit 304 connects an opening of the duct 299 in the third side 293 of the vacuum manifold 244 to a vacuum source (not shown). The third side 293 of the vacuum manifold 244 also has two apertures 306. A spring 308 is mounted in each aperture 306 connecting to the top wall 286 of the cavity 282.

The transport assembly 224 comprises two side guide rails 320, two second guide rails 322, two gears 324, two guide blocks 326, a Y-shaped member 328, and two plate-like members 330. Each of the side guide rails 320 have a first end 332, a second end 333 and an interior side 334. The first end 332 of the guide rails 320 is mounted to the interior of the bottom side 74 of the housing 64. The second end 333 of the guide rails 320 is mounted to the back support plate 122. Between the first and second ends of the guide rails 320 is a substantially F-shaped slot 336. The first protruding pin 268 on the second 252 and third 253 sides of the support block 242 of the vacuum assembly 222 reside and follow in the substantially F-shaped slot 336. A shaft 338 mounted between the interior of the third 68 and fourth 70 sides of the housing 64 passes through the two side guide rails 320 above the substantially F-shaped slot 336. Each one of the gears 324 are mounted to the shaft 338 adjacent to the interior side 334 of the two side guide rails 320. One end of the shaft 338 has a driving gear 340 which is driven by a motor assembly 342. Each of the second guide rails 322 have a first end 344 and second end 345. The first end 344 of the second guide rail 322 is angled and has a slot 346 for interconnection to the plate-like member 330. Between the first 344 and second 345 ends of each of the second guide rails 322 is toothed portion 348 which rides upon the gear 324 adjacent to the side guide rail 320. Each of the guide blocks 326 have a first side 350, a second side 351, a third side 352, and a fourth side 353. The first 350, second 351 and third 352 sides of the guide blocks 326 have a cutaway portion 356 which, when the guide block 326 is mounted with screws 357 to the interior side 334 and near the second end 333 of the side guide rail 320, forms a chamber and opening/s to accommodate the shaft 338, gear 324, the second guide rail 322, and the movement of the second guide rail 322 about the gear 324. The fourth side 353 of the guide block 326 has a grooved path 360. The Y-shaped member 328 has first ends 361 and a second end 363. The first ends 361 of the Y-shaped member 328 each have an extended portion 365 which resides and travels in the grooved path 360 of the guide block 326. The second end 363 of the Y-shaped member 328 is secured with screws 357 to the fourth side 294 of the vacuum manifold 244 of the vacuum element assembly 222. Each of the two plate-like members 330 has a first side 370 and a second side 372. The first side 370 of the plate-like member 330 has a keyway 373 which slideably engages on the rib 266 located on the second 252 and third 253 sides of the support block 242 of the vacuum element assembly 222. The first side 370 of the plate-like member 330 also has a locating pin 374 mounted which connects to a crosspiece 375 located in the slotted passageway 272 in the support block 242. Two springs 376 are located in the interior of the slotted passageway 272 and are mounted between the crosspiece 375 and a wall of the slotted passageway. Thus the two plate-like members 330 are connected by the crosspiece 375 and together can move vertically on the second 252 and third 253 sides of the support block 242 of the vacuum element assembly 222 by the keyway 373 engaging the rib 266. The second side 372 of the plate-like member 330 has a second protruding pin 378 which resides in the slot 346 on the angled first end 344 of the second guide rail 322 and in the substantially F-shaped slot 336 in the side guide rail 320 of the transport assembly 224. Two bushings 270 are mounted around a shaft of each of the second protruding pins 378. The plate-like member 330 has a cutaway portion 380 between the first 370 and second 372 sides in which the first protruding pin 268 of the second 252 and third 253 sides of the support block 242 of the vacuum element assembly 222 follows.

Referring to FIGS. 5, 6 and 6a, the back support members 226 are mounted to the interior of the bottom side 74 of the housing 64. The back support members 226 have a side 400 which is closest to the film storage platform 112. The roughened surface 228 is located on a portion of the film holding surface 116 of the film storage platform 112, centered or substantially centered between the two suction cups 240 in the vacuum element assembly 222. A preferred roughened surface suitable for use in this invention is the hook surface of hook and loop type fasteners. The roughened surface 228 generally breaks any film-to-film attractions that may occur between a dispensing film and an adjacent film when the leading edge of the dispensing film is brought across the roughened surface 228 by the vacuum-element assembly 222 and transport assembly 224 during dispensing. However, it is particularly preferred that the second embodiment dispensing assembly 220 also include at least one separation ledge 405 mounted on the film storage platform 112 substantially opposite at least one of the back support members 226. The separation ledges 405 form a separation slot 406 with a portion of the side 400 closest the film storage platform 112 of the back support member 226. The separation slot 406 is dimensioned to permit a single sheet of film to dispense or pass through the slot 406 at a time. The separation slot 406 improves the reliability of the dispensing assembly 220 to further reduce the possibility of misfeeds of a second film adjacent to a dispensing film.

Also included with the second embodiment of the storage apparatus 12 is a pair of exit nip rollers 150 which are mounted on a wall of the enclosed space 78 on the interior of the third 68 and fourth 70 sides of the housing 64. A nip of the exit rollers 150 is aligned or substantially aligned below the suction cups 240 when the vacuum element and transport assemblies 222, 224 are in a down position. The exit nip rollers 150 comprise an idler roller 151 and a drive roller 152, and operate accordingly. A film exit slot 158 is located in the bottom side 74 of the housing 64, aligned with the nip of the exit rollers 150. A second light gate 156 located between the exit rollers 150 and the exit slot 158 is the same as or similar to the first light gate 84, and moves to allow the exiting film to pass through the exit slot 158. A film sensor (not shown) is placed near the nip of the exit rollers 150 to detect the leading and lagging ends of a dispensing film.

FIG. 5 further shows three positions of the dispensing assembly 220 during a dispensing sequence; a rest position, a retracted position (shown in phantom lines), and a down position. The rest position is an initialized position for the vacuum element assembly 222 and transport assembly 224 for the loading, storing and dispensing sequences to begin. The loading sequence initializes the dispensing assembly 220 to the rest position to provide support for the pressure plate 106 when a film is stored in the storage apparatus 12. In the rest position, the suction cups 240 of the vacuum element assembly 222 are above the film storage platform 112, near or contacting the film closest the dispensing assembly 220, and on a film storage side of the roughened surface 228 preventing the closest film from being on or across the roughened surface 228 before a dispensing sequence begins. In the rest position, the first protruding pin 268 of the vacuum assembly 222 is in the angled arm of the slot 336 and the second protruding pin 378 of the transport assembly 224 is in the upper arm of the substantially F-shaped slot 336 in the side guide rail 320, and the Y-shaped member 328 is vertical.

To move from the rest position to the retracted position, the drive motor assembly 342 on the transport assembly 224 is energized and the second guide rail 322 moves along the driven gear 324 retracting the first 268 and second 378 protruding pins from the arms to the lower vertical portion of the substantially F-shaped slot 336. Also, the extended portions 365 on the Y-shaped member 328 follow the grooved path 360 in the guide blocks 326. Note that the springs 376 mounted to the crosspiece 375 and the interior of the slotted passageway 272 of the support block 242 allow for the range of motion necessary for the first 268 and second 378 protruding pins to change distances between each other from when the dispensing assembly 220 is in the rest position (where the protruding pins 268, 378 are furthest apart in the arms of the substantially F-shaped slot 336) to the retracted and/or down positions. The movements of the second guide rail 322 about the driven gear 324, the protruding pins 268, 378 in the substantially F-shaped slot 336, and the Y-shaped member 328 in the grooved path 360 cause the vacuum-element assembly 222 to retract from the rest position to the retracted position. During the course of the move from the rest to retracted position, the suction cups 240 carry a dispensing film 410 away from the film storage platform 112 at an angle and the leading edge of the dispensing film contacts the roughened surface 228 to thereby disrupt film-to-film interactions between the dispensing film and a second film adjacent to the dispensing film.

To move from the retracted position to the down position, the second guide rail 322 continues to be driven by the motor driven gear 324, moving the first and second protruding pins 268, 378 downward in the vertical portion of substantially F-shaped slot 336 to the down position. Thereby moving downward the second protruding pin 378 with the plate-like member 330, the cutaway portion 380 on the plate-like member 330 with the first protruding pin 268 and the vacuum-element assembly 222, and the Y-shaped member 328.

The vacuum for the suction cups 240 is broken on the dispensing film 410 when the dispensing assembly 220 has the leading edge of the film near or at the nip of the exit rollers 150 and the dispensing assembly 220 is substantially in the down position. When the transport assembly 224 of the dispensing assembly 220 is in the substantially down position, the extended portions 365 of the Y-shaped member 328 are at the lowest position in the grooved path 360 in the guide blocks 326. Also when the transport assembly 224 of the dispensing assembly 220 is in the substantially down position, the Y-shaped member 328 and, thus, the vacuum manifold 244 connected to the Y-shaped member cannot move and remains stationary. However, there is a small amount of travel remaining in the vertical portion of the substantially F-shaped slot 336 for the first protruding pin 268 on the support block 242. The second guide rails 322 continue the downward motion of the transport assembly 224 directing the cutaway portion 380 on the plate-like member 330 against the first protruding pin 268 (via the second protruding pin 378), completing the travel for the first protruding pin 268 downward into the lowest position in the substantially F-shaped slot 336. Thus the support block 242 with the suction cups 240 continues to move downward. Since there is space between the top wall 286 of the cavity 282 in the support block 242 and the vacuum manifold 244 and the keyways 296 on the vacuum manifold 244 can move along the retaining pins 288 in the cavity 282 of the support block 242, the springs 308 between the apertures 306 of the vacuum manifold 244 and top wall 286 of the cavity 282 compress. The compressing of the springs 308 causes a slight gap between the manifold 244 and the bottom 284 wall of the cavity 282, and the seal about the O-ring 302 is broken, breaking the vacuum to the suction cups 240. Thus, the suction cups 240 release their hold on the dispensing film 410, and the film is held by the nip of the exit rollers 150. The dispensing film 160 can then exit from the storage apparatus 12.

Figure 9A:
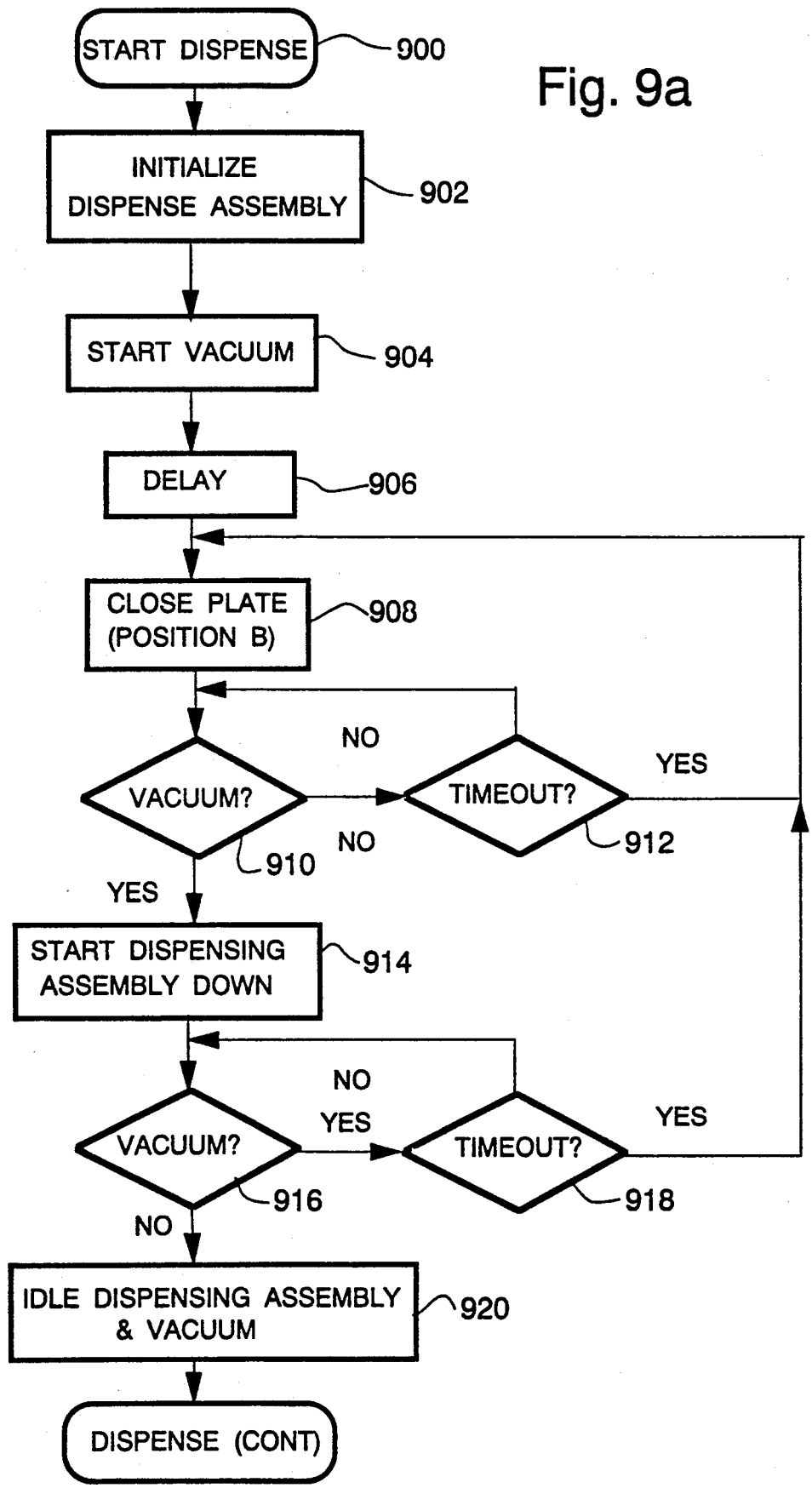

Referring to FIGS. 9a and 9b, the storage apparatus 12 operates as follows for a film dispensing 160 using the preferred embodiment of the dispensing assembly 220. A signal as indicated at 900 is sent to the storage apparatus 12 by the film handling unit 10 to start the dispense sequence, when the processor 42 associated with the film handling unit 10 is ready to develop a film. Note that generally delays are incorporated with the dispensing sequence to allow time for a mechanism to complete its action. Referring to block 902, the storage apparatus 12 checks that the vacuum element assembly 222 and transport assembly 224 of the dispensing assembly 220 are at the rest or initialize position, and the motor assembly 342 for the transport assembly 224 is energized. The vacuum for the suction cups 240 is started (see 904) and a delay (at 906) allows the vacuum time to settle out any surges in the vacuum system. The pressure plate 106 moves to position B (at 908) contacting the film 160 or the film stack 118 and applying pressure on the film or film stack 118 to assure intimate contact between the film closest the dispensing assembly 220, i.e., the dispensing film 160, and the cup portion 248 of the suction cup 240. As at 910, the storage apparatus 12 begins continuously checking to determine if the suction cups 240 have pulled a vacuum on the dispensing film 410. If a vacuum on the film is not detected after a period of time as indicated at 912, the dispensing sequence returns to move the pressure plate 106 to position B. If the vacuum on the film is detected, the vacuum element assembly 222 is moved to the retracted position and downward (see 914) to the down position by the transport assembly 224. The storage apparatus 12 then begins continuously checking (see 916) to determine if there still is a vacuum by the suction cups 240 on the dispensing film 160. If there is a vacuum on the dispensing film 160 after a period of time (see 918), the dispensing sequence returns to move the pressure plate 106 to position B and continues with the dispensing sequence. If there is no vacuum by the suction cups 240 (i.e., the o-ring 302 seal on the vacuum duct 260, 299 has been broken), the vacuum element assembly 222 and the vacuum are idled (see 920).

The dispensing sequence continues as shown in FIG. 9b, when the drive motor for the exit rollers 150 is started and the second light gate 156 is opened at the same time as seen at 922. The pressure plate 106 returns to position A as indicated at 924. The exit sensor begins continuously checking if the leading edge of the dispensing film 160 has been detected as indicated at 926 and thus whether the film is in the nip of the exiting rollers 150. If after a period of time (see 928) the leading edge of the dispensing film 160 has not been detected, the dispensing sequence is ended. If the leading edge has been detected, the sensor then begins continuously checking for the trailing edge of the dispensing film 410 (see 930). If after a period of time the trailing edge of the dispensing film is not detected (see 932), the dispensing sequence is ended. If the trailing edge of the dispensing film 410 is detected, there is a delay (at 934) to allow time for the dispensing film to travel through the exit slot 158 and out of the storage apparatus 12. Before the dispensing sequence is ended the exit roller drive motor is idled (at 936); the second light gate is closed 156 (at 938); the vacuum element assembly 222 is returned to the rest position by the transport assembly 224 (at 990); the status of the film as monitored by the microprocessor in the storage apparatus 12 and the film handling unit 10 is updated (at 942); and all other motors (i.e., transport assembly motor 342) are idled (at 944).

The storage apparatus 12 includes a control system having a microprocessor which interfaces with the microprocessor in the film handling unit 10. The control system may include commercially available motor control assemblies, a computer and other electrical components (such as, amplifiers, analog to digital converters, digital to analog converters, etc.) to connect the motors and sensors to the computer.

Those skilled in the art, having the benefit of the teachings of the present invention as hereinabove set forth, can effect numerous modifications thereto. These modifications are to be construed as being encompassed within the scope of the present invention as set forth in the appended claims.

What is claimed is:

1. An apparatus for receiving a plurality of sheet films in a plurality of sizes each sheet having at least one edge, storing the films and dispensing the films serially, the apparatus comprising:
    a light-tight housing including a film entrance slot, a film storage cavity and a film exit slot;
    a stationary film storage platform having a substantially horizontal and substantially flat surface in the housing for storing at least one sheet of film on its edge;
    a first pair of nip rollers for transporting the at least one film sheet from the film entrance slot to the film storage platform;
    film supporting means for supporting the at least one sheet of film when the film is stored on the platform;
    pressure plate means for contacting, supporting and transporting the at least one film sheet along the edge along the platform to a dispensing position in contact with the film supporting means; and
    single film sheet dispensing means, associated with the platform and the film supporting means, for receiving at least one film sheets and dispensing one sheet at a time.

2. The apparatus of claim 1 comprising:
    a second pair of nip rollers for transporting the film out of the housing through the film exit slot.

3. The apparatus of claim 1, wherein the platform further comprises at least one ledge which forms a separation slot with the supporting means.

4. An apparatus for receiving a plurality of sheet films in a plurality of sizes each sheet having a least one edge, storing the films and dispensing the films serially, the apparatus comprising:
    a light-tight housing including a film entrance slot, a film storage cavity and a film exit slot;
    a film storage platform in the housing for storing at least one sheet of film on its edge;
    a first pair of nip rollers for transporting a film sheet from the film entrance slot to the film storage platform;
    film supporting means for supporting the at least one sheet of film when the film is stored on the platform;

pressure plate means for contacting, supporting and transporting the at least one film sheet along the edge along the platform to a dispensing position in contact with the film supporting means;

single film sheet dispensing means, associated with the platform and the film supporting means, for receiving at least one film sheets and dispensing one sheet at a time;

a second pair of nip rollers for transporting the film out of the housing through the film exit slot; and wherein the film storage platform comprises a roughened surface in proximity to the dispensing means, the dispensing means comprising:

means for moving a first one of the at least one sheet, the first sheet closest to the supporting means, the moving means for moving the edge of the first sheet across the roughened surface thereby separating the first sheet from any others of the at least one stored film sheets and for moving the first sheet to the second pair of nip rollers.

5. The apparatus of claim 4, wherein the moving means further comprises:

a vacuum assembly having a vacuum operated carrying elements for carrying the first one of the at least one sheet; and a transport assembly for moving the vacuum assembly from a film receiving position associated with the film supporting means and the platform to a dispensing position associated with the second pair of nip rollers.

6. An apparatus for receiving a plurality of sheet films in a plurality of sizes each sheet having a least one edge, storing the films and dispensing the films serially, the apparatus comprising:

a light-tight housing including a film entrance slot, a film storage cavity and a film exit slot;

a film storage platform in the housing for storing at least one sheet of film on its edge;

a first pair of nip rollers for transporting a film sheet from the film entrance slot to the film storage platform;

film supporting means for supporting the at least one sheet of film when the film is stored on the platform;

pressure plate means for contacting, supporting and transporting the at least one film sheet along the edge along the platform to a dispensing position in contact with the film supporting means;

single film sheet dispensing means, associated with the platform and the film supporting means, for receiving at least one film sheets and dispensing one sheet at a time;

the platform comprising at least one ledge which forms a separation slot with the supporting means, wherein the slot has an opening suitable to pass an edge of a single film sheet; and the dispensing means further comprising:

a separating roller associated with the film supporting means for contacting and driving a single film sheet closest the supporting means through the separation slot thereby separating the single film sheet from any other of the at least one film sheets; and a dispensing pair of nip rollers between the film storage platform and the second pair of nip rollers, a nip between the dispensing rollers aligned or substantially aligned below the slot to capture the separated single film sheet wherein the dispensing rollers and the separating roller dispense the single film sheet to the second pair of nip rollers.

7. The apparatus of claim 6, wherein the second pair of nip rollers transports the single film out of the housing through the film exit slot and the nip of the dispensing pair of nip rollers retains a next film sheet of the at least one stored film sheets from dispensing with the single film sheet.

8. An apparatus for receiving a plurality of sheet films in a plurality of sizes each sheet having a least one edge, storing the films and dispensing the films serially, the apparatus comprising:

a light-tight housing including a film entrance slot, a film storage cavity and a film exit slot;

a film storage platform in the housing for storing at least one sheet of film on its edge;

a first pair of nip rollers for transporting a film sheet from the film entrance slot to the film storage platform;

film supporting means for supporting the at least one sheet of film when the film is stored on the platform;

pressure plate means for contacting, supporting and transporting the at least one film sheet along the edge along the platform to a dispensing position in contact with the film supporting means;

single film sheet dispensing means, associated with the platform and the film supporting means, for receiving at least one film sheets and dispensing one sheet at a time; and wherein the pressure plate means further comprises:
a shaft;
a gear mounted on each end of the shaft;
a pair of first arms, each of the first arms having a first end and a second end, the first ends pivotally mounted to the housing;
a second arm extending from each of the first arms, the second arms having toothed portions engaging the gears;
a plate pivotally mounted to the second ends of the first arms; and
a motor assembly for driving the shaft.

9. In an apparatus for automatically unloading and transporting from a cassette a plurality of film sheets in a plurality of sizes, each sheet having at least one edge, to an intermediate film storage apparatus for receiving, storing and dispensing the sheets serially, the intermediate film storage apparatus comprising:

a light-tight housing including a film entrance slot, a film storage cavity and a film exit slot;

a stationary film storage platform having a substantially horizontal and substantially flat surface in the housing for storing at least one sheet of film on its edge;

a first pair of nip rollers for transporting the at least one film sheet from the film entrance slot to the film storage platform;

pressure plate means for contacting, supporting and transporting the at least one film sheet along the edge along the platform to a dispensing position in contact with the film supporting means; and single film sheet dispensing means, associated with the platform and the film supporting means, for receiving the at least one film sheets and dispensing one sheet at a time.

10. The apparatus of claim 9, further comprising:

a second pair of nip rollers for transporting the film out of the housing through the film exit slot.

11. The apparatus of claim 9, wherein the platform further comprises at least one ledge which forms a separation slot with the supporting means.

12. In an apparatus for automatically unloading and transporting from a cassette a plurality of film sheets in a plurality of sizes, each sheet having at least one edge, to an intermediate film storage apparatus for receiving, storing and dispensing the sheets serially, the intermediate film storage apparatus comprising:
- a light-tight housing including a film entrance slot, a film storage cavity and a film exit slot;
- a film storage platform in the housing for storing at least one sheet of film on its edge;
- a first pair of nip rollers for transporting a film sheet from the fifth entrance slot to the film storage platform;
- film supporting means for supporting the at least one sheet of film when the film is stored on the platform;
- pressure plate means for contacting, supporting and transporting the at least one film sheet along the edge along the platform to a dispensing position in contact with the film supporting means;
- single film sheet dispensing means associated with the platform and the film supporting means, for receiving the at least one film sheets and dispensing one sheet at a time;
- a second pair of nip rollers for transporting the film out of the housing through the film exit slot; and
- wherein the film storage platform comprises a roughened surface in proximity to the dispensing means, the dispensing means comprising:
  - means for moving the first one of the at least one sheet, the first sheet closest to the supporting means, the moving means for moving the edge of the first sheet across the roughened surface thereby separating the first sheet from any others of the at least one stored film sheets and for moving the separated first sheet to the second pair of nip rollers.

13. The apparatus of claim 12, wherein the moving means further comprising:
- a vacuum assembly having vacuum operated carrying elements for carrying the first one of the at least one sheet; and
- a transporting assembly for moving the vacuum assembly from a film receiving position associated with the film supporting means and the platform to a dispensing position associated with the second pair of nip rollers.

14. In an apparatus for automatically unloading and transporting from a cassette a plurality of film sheets in a plurality of sizes, each sheet having at least one edge, to an intermediate film storage apparatus for receiving, storing and dispensing the sheets serially, the intermediate film storage apparatus comprising:
- a light-tight housing including a film entrance slot, a film storage cavity and a film exit slot;
- a film storage platform in the housing for storing at least one sheet of film on its edge;
- a first pair of nip rollers for transporting a film sheet from the film entrance slot to the film storage platform;
- film supporting means for supporting the at least one sheet of film when the film is stored on the platform;
- pressure plate means for contacting, supporting and transporting the at least one film sheet along the edge along the platform to a dispensing position in contact with the film supporting means;
- single film sheet dispensing means, associated with the platform and the film supporting means, for receiving at least one film sheets and dispensing one sheet at a time; the platform comprising at least one ledge which forms a separation slot with the supporting means, wherein the slot has an opening suitable to pass an edge of a single film sheet; and
- the dispensing means further comprising:
  - a separating roller associated with the film supporting means for contacting and driving a single film sheet closest the supporting means through the separation slot thereby separating the single film sheet from any other of the at least one film sheets; and
  - a dispensing pair of nip rollers between the film storage platform and the second pair of nip rollers, a nip between the dispensing rollers aligned or substantially aligned below the slot to capture the separated single film sheet wherein the dispensing rollers and the separating roller dispense the single film sheet to the second pair of nip rollers.

15. The apparatus of claim 14, wherein the second pair of nip rollers transports the single film out of the housing through the film exit slot and the nip of the dispensing pair of nip rollers retains a next film sheet of the at least one stored film sheets from dispensing with the single film sheet.

16. In an apparatus for automatically unloading and transporting from a cassette a plurality of film sheets in a plurality of sizes, each sheet having at least one edge, to an intermediate film storage apparatus for receiving, storing and dispensing the sheets serially, the intermediate film storage apparatus comprising:
- a light-tight housing including a film entrance slot, a film storage cavity and a film exit slot;
- a film storage platform in the housing for storing at least one sheet of film on its edge;
- a first pair of nip rollers for transporting a film sheet from the film entrance slot to the film storage platform;
- film supporting means for supporting the at least one sheet of film when the film is stored on the platform;
- pressure plate means for contacting, supporting and transporting the at least one film sheet along the edge along the platform to a dispensing position in contact with the film supporting means;
- single film sheet dispensing means, associated with the platform and the film supporting means, for receiving at least one film sheets and dispensing one sheet at a time; and
- wherein the pressure plate means further comprises:
  - a shaft;
  - a gear mounted on each end of the shaft;
  - a pair of first arms, each of the first arms having a first end and a second end, the first ends pivotally mounted to the housing;
  - a second arm extending from each of the first arms, the second arms having toothed portions engaging the gears;
  - a plate pivotally mounted to the second ends of the first arms; and
  - a motor assembly for driving the shaft.

* * * * *